United States Patent
Lee et al.

(10) Patent No.: US 9,295,042 B2
(45) Date of Patent: Mar. 22, 2016

(54) METHOD AND APPARATUS FOR RECONFIGURING A COMMON CHANNEL

(75) Inventors: Young Dae Lee, Gyeonggi-do (KR);
Sung Duck Chun, Gyeonggi-do (KR);
Myung Cheul Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1010 days.

(21) Appl. No.: 11/913,670

(22) PCT Filed: May 2, 2006

(86) PCT No.: PCT/KR2006/001650
§ 371 (c)(1),
(2), (4) Date: Feb. 17, 2011

(87) PCT Pub. No.: WO2006/118414
PCT Pub. Date: Nov. 9, 2006

(65) Prior Publication Data
US 2011/0164540 A1    Jul. 7, 2011

(30) Foreign Application Priority Data

May 4, 2005  (KR) .......................... 10-2005-0037757

(51) Int. Cl.
*H04W 4/00* (2009.01)
*H04H 20/71* (2008.01)
*H04W 72/04* (2009.01)
*H04L 12/18* (2006.01)
*H04W 48/12* (2009.01)
(Continued)

(52) U.S. Cl.
CPC ........... *H04W 72/042* (2013.01); *H04L 12/189* (2013.01); *H04W 48/12* (2013.01); *H04W 72/005* (2013.01); *H04W 76/046* (2013.01)

(58) Field of Classification Search
USPC .......................................................... 370/329
See application file for complete search history.

(56) References Cited

U.S. PATENT DOCUMENTS

2003/0103478 A1   6/2003  Eriksson
2004/0105402 A1   6/2004  Yi et al.
2004/0228294 A1*  11/2004  Kim et al. ..................... 370/312

FOREIGN PATENT DOCUMENTS

EP        1501328       1/2005
JP        2005-525065   8/2005
(Continued)

OTHER PUBLICATIONS

3rd Generation Partnership Project; Introduction of the Multimedia Broadcast Multicast Service (MBMS) in the Radio Access Network (RAN); Stage 2, 3GPP TS 25.346 V6.4.0 (Mar. 2005).*

(Continued)

*Primary Examiner* — Gregory Sefcheck
*Assistant Examiner* — Majid Esmaeilian
(74) *Attorney, Agent, or Firm* — Lee, Hong, Degerman, Kang & Waimey (57) ABSTRACT

The present invention for reconfiguring a common channel receives modified channel configuration information of a first common channel through a second common channel, and determines a starting time of reconfiguring the first common channel, according to a type of an information element including the modified channel configuration information. Also, the present invention reconfigures the first common channel from the determined starting time. According the present invention, the common channel, such as the MCCH, may be reconfigured more efficiently.

7 Claims, 8 Drawing Sheets

(51) Int. Cl.
*H04W 72/00* (2009.01)
*H04W 76/04* (2009.01)

(56) References Cited

FOREIGN PATENT DOCUMENTS

| RU | 2233034 | 7/2004 |
| WO | 2004017541 A1 | 2/2004 |
| WO | WO 2005/018116 | 2/2005 |
| WO | 2006104335 A2 | 10/2006 |

OTHER PUBLICATIONS

Vogiatzis N. ; et al. "An adaptive multicarrier wireless access system." in IEEE Wireless Communications and Networking Conference, 2000.

* cited by examiner

METHOD AND APPARATUS FOR RECONFIGURING A COMMON CHANNEL

CROSS-REFERENCE TO RELATED APPLICATIONS

This application is the National Stage filing under 35 U.S.C. §371 of International Application No. PCT/KR2006/001650, filed on May 2, 2006, which claims the benefit of earlier filing date and right of priority to Korean Application No. 10-2005-0037757, filed on May 4, 2005.

TECHNICAL FIELD

The present invention relates generally to a mobile communication system and, more particularly, to reconfigure a common channel for a mobile communication.

BACKGROUND ART

Figure 1:
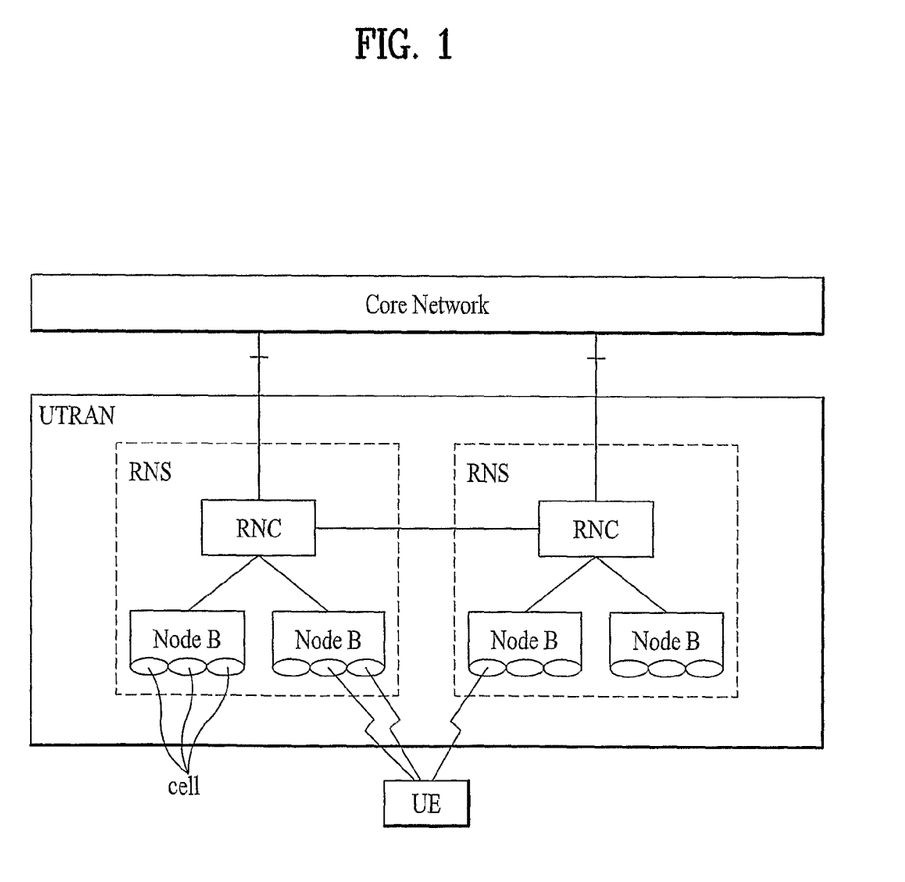
FIG. 1 is a diagram illustrating a network structure of a universal mobile telecommunication system (UMTS).

FIG. 1 is a diagram illustrating a network structure of a universal mobile telecommunication system (UMTS). Generally, a UMTS system 10 comprises a user equipment (UE) 11, a UMTS terrestrial radio access network (UTRAN) 12, and a core network (CN) 13. Herein, the UE may be a mobile terminal in general. The UTRAN 12 comprises at least one of radio network sub-systems (RNSs) 13, and each RNS comprises a radio network controller (RNC) 131 and at least one of Node B 132 which is controlled by the RNC. The Node B includes at least one cell 133.

Figure 2:
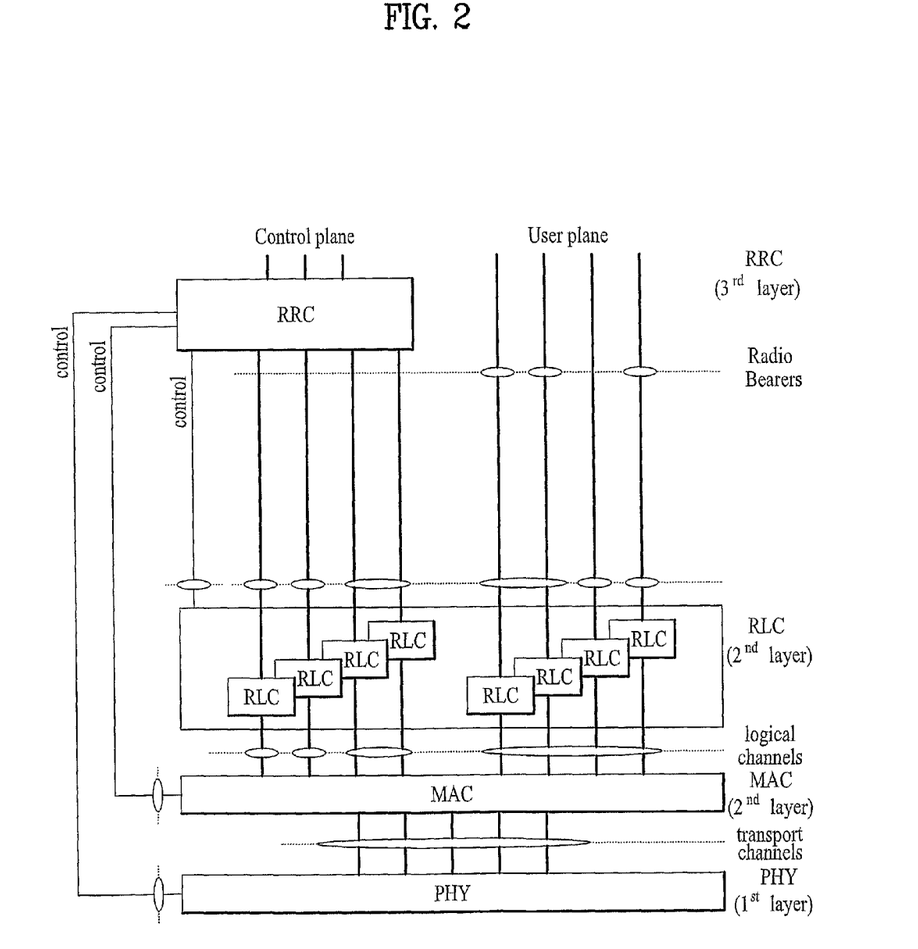
FIG. 2 is a diagram illustrating a layer structure of radio interface protocol in mobile communication system.

FIG. 2 is a diagram illustrating a layer structure of radio interface protocol in mobile communication system. As shown in FIG. 2, the radio interface protocol comprises horizontally a physical layer, a data link layer and a network layer. Meanwhile, the radio interface protocol comprises vertically a user plane for transmitting user data and a control plane for signaling.

The protocol layers of FIG. 2 comprises L1 (the first layer), L2 (the second layer) and L3 (the third layer). The layers of FIG. 2 correspond to 3 layers from the bottom according to the open system interconnection (OSI) layer structure.

The first layer, i.e., the physical (PHY) layer, provides the higher layer with information transfer service through physical channels. The PHY layer is connected to the second layer, i.e., medium access control (MAC) layer, with transport channels and data is transferred between MAC layer and PHY layer through the transport channels. Meanwhile, data is transferred between the PHY layers of a transmitting side and the PHY layer of a receiving side through the PHY channels.

The MAC layer provides a radio link control (RLC) layer with service through logical channels. The RLC layer of L2 supports reliable data transmission and may segment and concatenate service data units (SDUs) transferred from a higher layer.

A radio resource control (RRC) layer located at the bottom of L3 in the protocol layers is defined on the control plane, may control the logical channels, the transport channels and the physical channels in relation to configuration, reconfiguration and release of radio bearers (RBs). Herein, the RB means a service supported by L2 for data transmission between UE and UTRAN. Generally, to set up a RB means a process for defining a protocol layers and channels for providing a specific service, as well as a process for configuring parameters and operation, corresponding to the specific service.

Moreover, the RRC layer may broadcast system information through a broad control channel (BCCH). The system information regarding a cell is broadcasted to UEs using at least one of system information block (SIB). If the system information is modified, the UTRAN transmits BCCH modification information to the UEs through a paging channel (PCH) or a forward access channel (FACH), for the UEs to have the latest system information.

As an example of point-to-multipoint service, multimedia broadcast/multicast service (MBMS) is explained as follows. The MBMS supplies a streaming or background service using a MBMS bearer which is set up generally for downlink transmission. A MBMS service comprises at least one session, MBMS data is transmitted to UEs using the MBMS bearer during ongoing session. If the UE is activated corresponding to a service to which the UE have been subscribed, the UE may receive the service.

Figure 3:
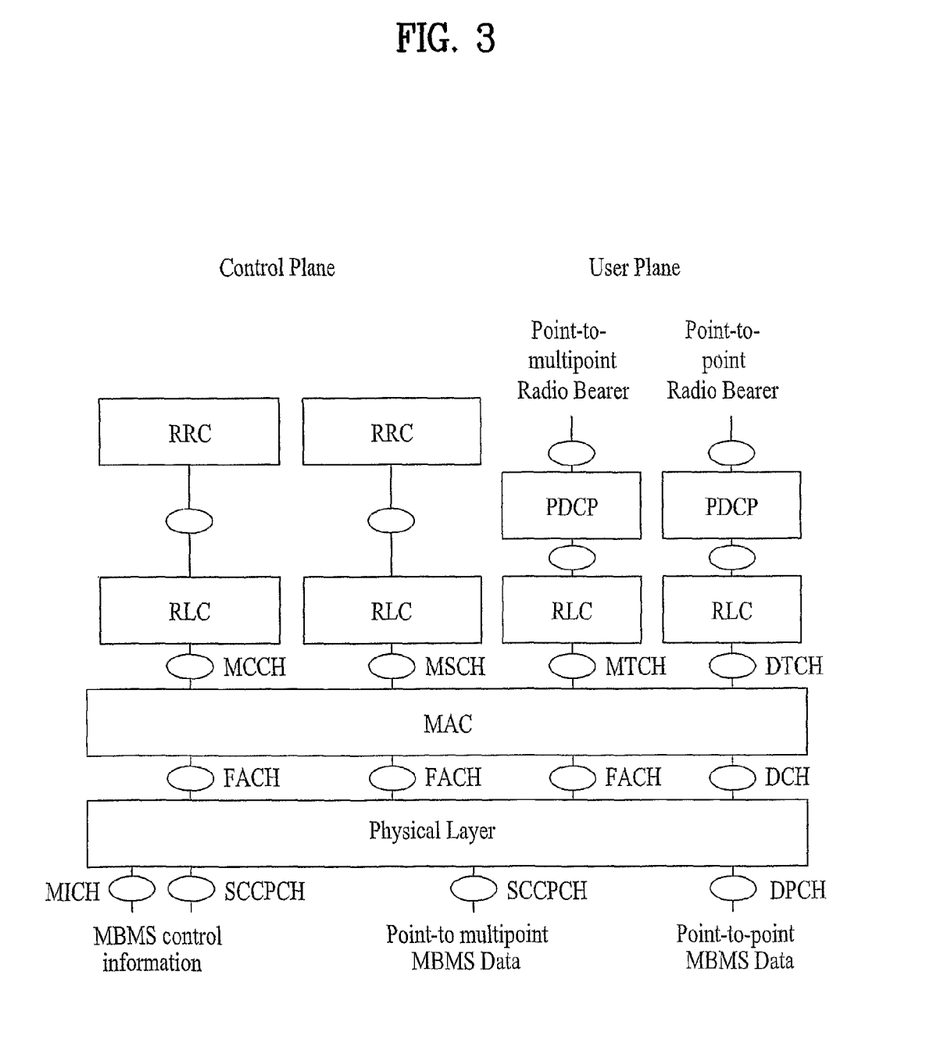
FIG. 3 is a diagram illustrating channels for MBMS.

FIG. 3 is a diagram illustrating channels for MBMS. The UTRAN provides UEs with MBMS using a RB. The UTRAN may set up two types of RBs, i.e., a point-to-point RB and a point-to-multipoint RB. Herein, the point-to-point RB corresponds to a bi-directional RB. The point-to-point RB employs a dedicated traffic channel (DTCH) as a logical channel, a dedicated channel (DCH) as a transport channel, and a dedicated physical channel (DPCH) or a secondary common control physical channel (SCCPCH) as a physical channel.

Meanwhile, the point-to-multipoint RB corresponds to a uni-directional RB. As shown in FIG. 3, the point-to-multipoint RB may employ the MBMS traffic channel (MTCH) as a logical channel, the FACH as a transport channel, and the SCCPCH as a physical channel. The MTCH is configured for each MBMS provided in a cell, is used for transmission of user data corresponding to a MBMS on the user plane. A MBMS control channel (MCCH) which is a logical channel is mapped to the FACH, and the transport channel FACH is mapped to the SCCPCH. In general, one MCCH is allocated to one cell.

According to the related art, if the SCCPCH to which the MCCH is mapped is reconfigured, the UTRAN transmits control information through both the previously configured SCCPCH and the reconfigured SCCPCH for a while, because the UE isn't aware of the timing of SSCPCH reconfiguration. Therefore, the transmission of the control information through two physical channels causes waste of radio resource.

DISCLOSURE OF INVENTION

Accordingly, the present invention is directed to a channel reconfiguration method that substantially obviates one or more problems due to limitations and disadvantages of the related art.

An object of the present invention is to provide method for reconfiguration of a channel through which control information for point-to-multipoint service is transmitted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of reconfiguring a common channel in a communication system comprises receiving modified channel configuration information of a first common channel (MCCH) through a second common channel (BCCH). The method also comprises determining a starting time of reconfiguring the first common channel, according to a type of an information element including the modified channel configuration information. The method also comprises reconfiguring the first common channel from the determined starting time.

Preferably, the starting time is determined as a starting point of a next modification period, if the information element corresponds to a first type information element.

Preferably, the first control channel is reconfigured on receiving the modified channel configuration information, if the information element corresponds to a second type information element.

Preferably, the starting time is determined as a starting point of a next modification period, if the information element corresponds to a second type information element and the modified channel configuration information include an indicator indicating the starting time of reconfiguring.

In another aspect of the present invention, a mobile terminal of the present invention comprises The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principles of the invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
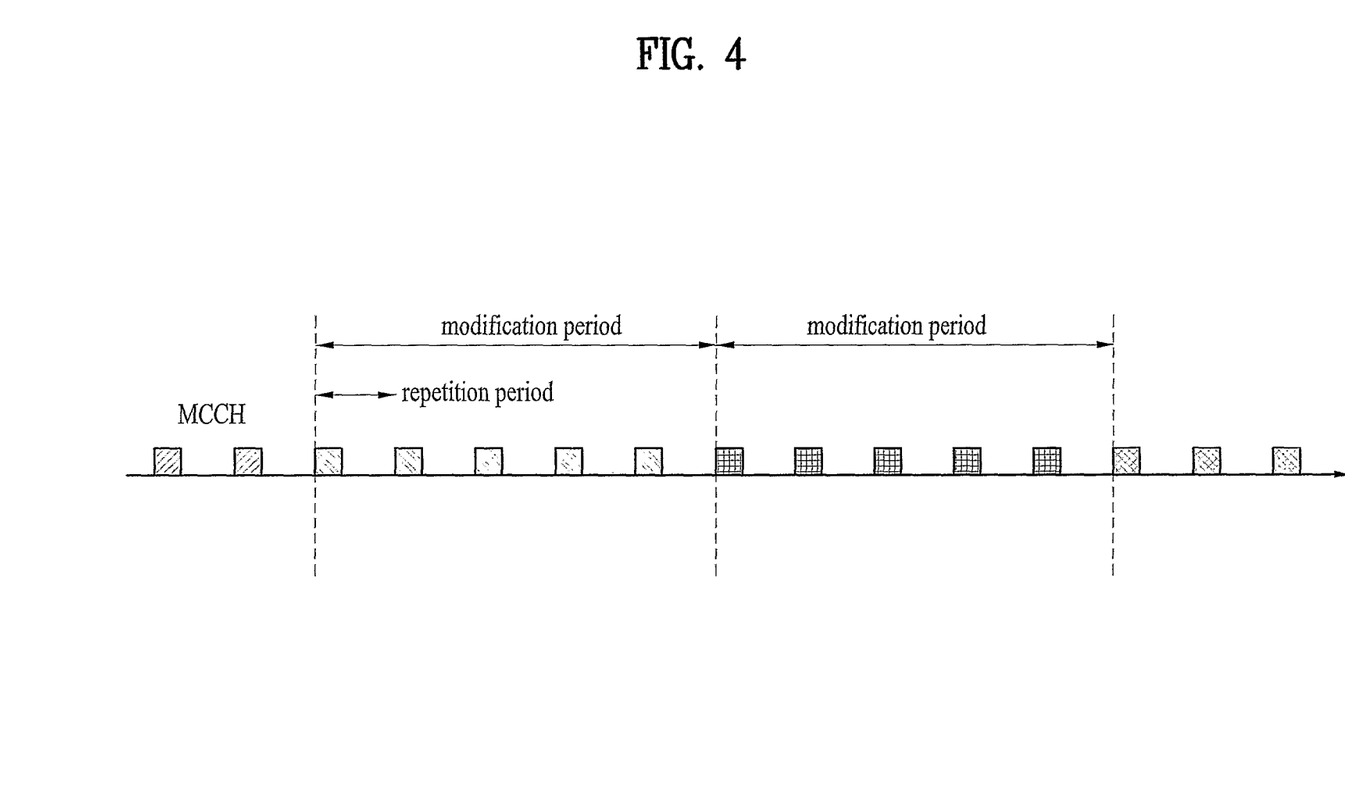
FIG. 4 is a diagram illustrating a method for transmitting MCCH information through the MCCH.

FIG. 4 is a diagram illustrating a method for transmitting MCCH information through the MCCH. As illustrated in FIG. 4, the MCCH information is transmitted through MCCH with two types of periods, i.e., modification period and repetition period. The MCCH information comprises critical information and non-critical information. The non-critical information may be modified in the modification period or in the repetition period. But, the critical information may be modified in the modification period. That is, the critical information is transmitted (repeatedly) during the modification period, and modified critical information is transmitted at the start time of the modification period. The MCCH information means a control message regarding MBMS, and the control message may be a RRC message. The MCCH information includes modified service information (MSI), unmodified service information (USI), point-to-multipoint RB information and access information. Herein, the access information message corresponds to the non-critical information, and the other information message corresponds to the critical information. The access information is transmitted per an access period which is equal to or less than the repetition period. Further, the repetition period may comprise multiple of the access period.

If the UTRAN transmits a control message corresponding to a MBMS, the control message includes a MBMS transmission identity. Herein, the MBMS transmission identity comprises a MBMS session identity and a MBMS service identity. For example, when the UTRAN transmits the MBMS MSI message, the MBMS MSI message includes the MBMS transmission identity and service information corresponding to the MBMS transmission identity.

The UTRAN periodically transmits information regarding whether the MCCH information is modified, thorough a MBMS notification Indicator channel (MICH). Therefore, if a UE wants to receive a specific MBMS data but a session of the specific MBMS doesn't start yet, the UE receives information through a MICH instead of a MCCH or a MTCH.

The UTRAN may modify the MCCH information by generating, adding, changing or deleting parameters from the MCCH information. The UTRAN transmits a MICH message and a MSI message to notify the UE of whether the MCCH information is going to be modified during the modification period. The MSI message includes at least one service identity corresponding to each service modified in the modification period, and information for operating the UE subscribed to the service. Herein, the service identity may be a MBMS transmission identity. The MBMS transmission identity may comprise a MBMS service identity identifying a service. Also, the MBMS transmission identity may comprise combination of a MBMS session identity and a MBMS service identity, the MBMS session identity identifies a service session. A service identity corresponding to a service not being modified during the modification period, among the services currently provided in a cell, is transmitted using a USI message. Herein, the service identity may be a MBMS transmission identity corresponding to the service.

When a service session of a MBMS starts, the UTRAN transmits, through the MICH, a notification indicator (NI) notifying UEs of receiving information through the MCCH. If a UE receives the NI from the UTRAN, the UE is trying to receive the MBMS data. If a UE receives a NI notifying the service modification through the MICH, the UE receives the MCCH information during the modification period indicated by the NI. During receiving the MCCH information, the UE receives the MSI message, and checks whether the MBMS is modified. If the UE detects modification of the MBMS, the UE receives modified MCCH information. Meanwhile, the UE receives the MSI and the USI messages which are transmitted during the modification period, and may acquire a service list listing all services currently provided in the cell in the modification period.

A UE trying to receive a MBMS service using a point-to-multipoint RB receives MCCH information including RB information through a MCCH, and sets up the point-to-multipoint RB in itself using the MCCH information. After setting up the point-to-multipoint RB, the UE receives MBMS data through the physical channel SCCPCH to which the logical channel MTCH is mapped.

The UTRAN may transmit the MBMS data through the MTCH. Herein, as illustrated FIG. 3, the UTRAN transmits a scheduling message to the UE through a MBMS scheduling channel (MSCH) corresponding to the SCCPCH to which the MTCH is mapped. The scheduling message includes information regarding a start point and an ending point of MBMS data transmission in a scheduling period. Therefore, the UTRAN informs the UE of a transmission period of scheduling information (scheduling period) in advance.

Figure 5:
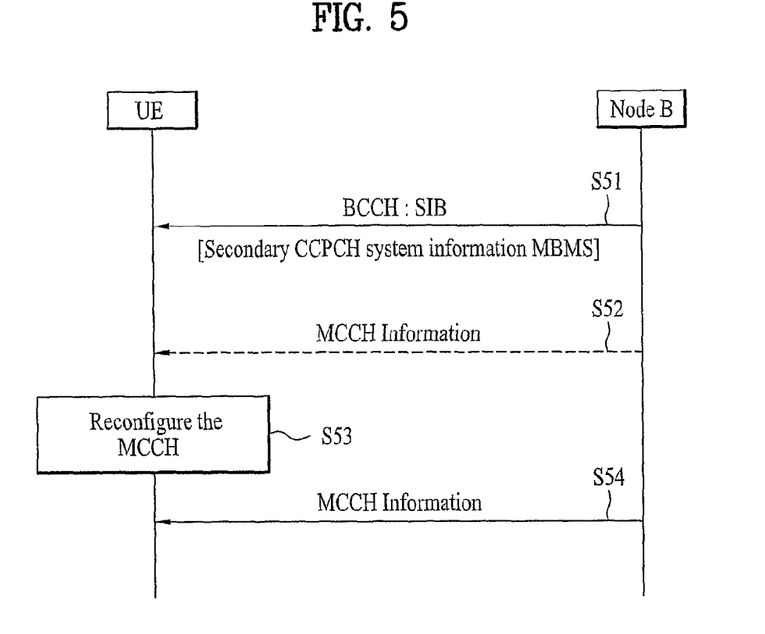
FIG. 5 is a flow chart illustrating a process for reconfiguring the MCCH according to the first embodiment.

FIG. 5 is a flow chart illustrating a process for reconfiguring the MCCH according to the first embodiment. As shown in FIG. 5, the UTRAN broadcasts SIB including secondary CCPCH system information MBMS, through the BCCH. Herein, the secondary CCPCH system information MBMS includes MCCH reconfiguration information. Then, a UE is able to be aware the modification of the BCCH channel information, and receives the secondary CCPCH system information MBMS through the BCCH. The UE is able to acquire the MCCH reconfiguration information from the secondary CCPCH system information MBMS S51.

The UE doesn't reconfigure the MCCH until the modification period in which the UE receives the secondary CCPCH system information MBMS is finished. If it is necessary to receive the MCCH information, the UE is able to receive the MCCH information according to the previous configuration S52.

When the modification period in which the secondary CCPCH system information MBMS is finished, the UE starts to reconfigure the MCCH using the MCCH reconfiguration information S53. Then, the UTRAN starts to transmit signals through the reconfigured MCCH, and the UE starts to receive signals through the reconfigured MCCH also S54.

Figure 6:
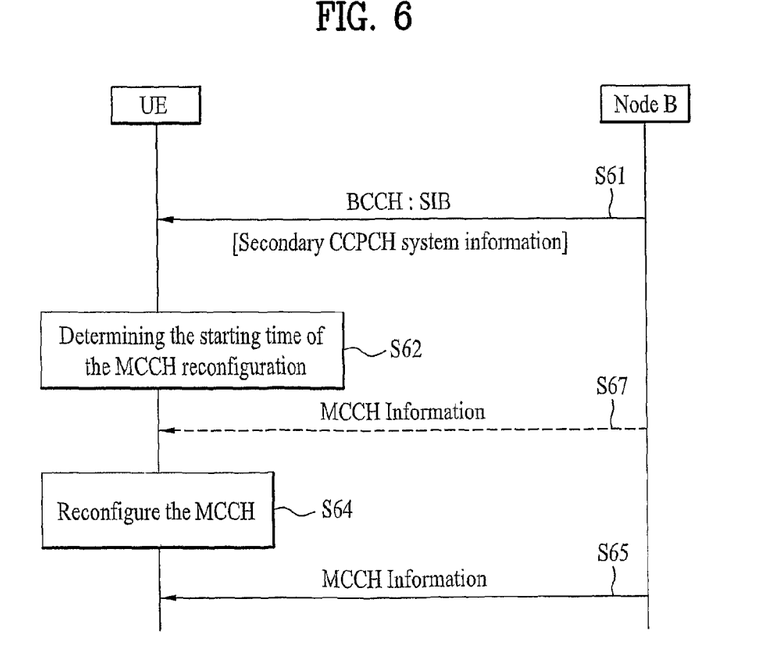
FIG. 6 is a flow chart illustrating a process for reconfiguring the MCCH according to the second embodiment.

FIG. 6 is a flow chart illustrating a process for reconfiguring the MCCH according to the second embodiment. The embodiment illustrated in FIG. 6 corresponds to a case that the reconfiguration of the MCCH starts at the starting time of next modification period.

In FIG. 6, a UTRAN broadcasts SIB including secondary CCPCH system information, through the BCCH. Herein, the secondary CCPCH system information includes MCCH reconfiguration information. Then, a UE is able to be aware the modification of the BCCH channel information, and receives the secondary CCPCH system information through the BCCH. The UE is able to acquire the MCCH reconfiguration information from the secondary CCPCH system information S61.

Then, the UE decides starting time of the MCCH reconfiguration according to the secondary CCPCH system information S62. Herein, the UE may decide the starting time of the MCCH reconfiguration according to an indication which is included in the secondary CCPCH system information. Also, the UE may decide the starting time of the MCCH reconfiguration according to the secondary CCPCH system information without indication.

According to the MCCH reconfiguration method using the indication, the UE receives the secondary CCPCH system information and checks whether the secondary CCPCH system information includes the indication. If the secondary CCPCH system information doesn't include the indication, the UE may start to reconfigure the MCCH at the starting time of the next modification period. But, if the secondary CCPCH system information includes the indication, the UE may start to reconfigure the MCCH on receiving the secondary CCPCH system information. Meanwhile, if the secondary CCPCH system information includes the indication, the UE may start to reconfigure the MCCH at the starting time of the next modification period. Also, if the secondary CCPCH system information doesn't include the indication, the UE may start to reconfigure the MCCH on receiving the secondary CCPCH system information.

Furthermore, if the indication indicates that the starting time of the MCCH reconfiguration corresponds to the starting time of the next modification period, the UE may start to reconfigure the MCCH at the starting time of the next modification period, according to the indication. But, if the indication indicates immediate reconfiguration of MCCH, the UE may start to reconfigure the MCCH on receiving the secondary CCPCH system information.

According to the MCCH reconfiguration method without the indication, the UE receives the secondary CCPCH system information without indication, and may start to reconfigure the MCCH at the starting time of the next modification period. Herein, the secondary CCPCH system information includes other channel reconfiguration information than the MCCH, the UE may decide to employ the channel reconfiguration information on receiving the secondary CCPCH system information.

In case that the UE starts to reconfigure the MCCH at the starting time of the next modification period, the UE may receive signals through the MCCH which is not reconfigured yet, until the end time of the present modification period (i.e. the starting time of the next modification period) S63. When the next modification period starts, the UE starts to reconfigure the MCCH S64. After the reconfiguring of the MCCH, the UTRAN transmits control information through the reconfigured MCCH and the UE receives the control information through the reconfigured MCCH S65.

Figure 7:
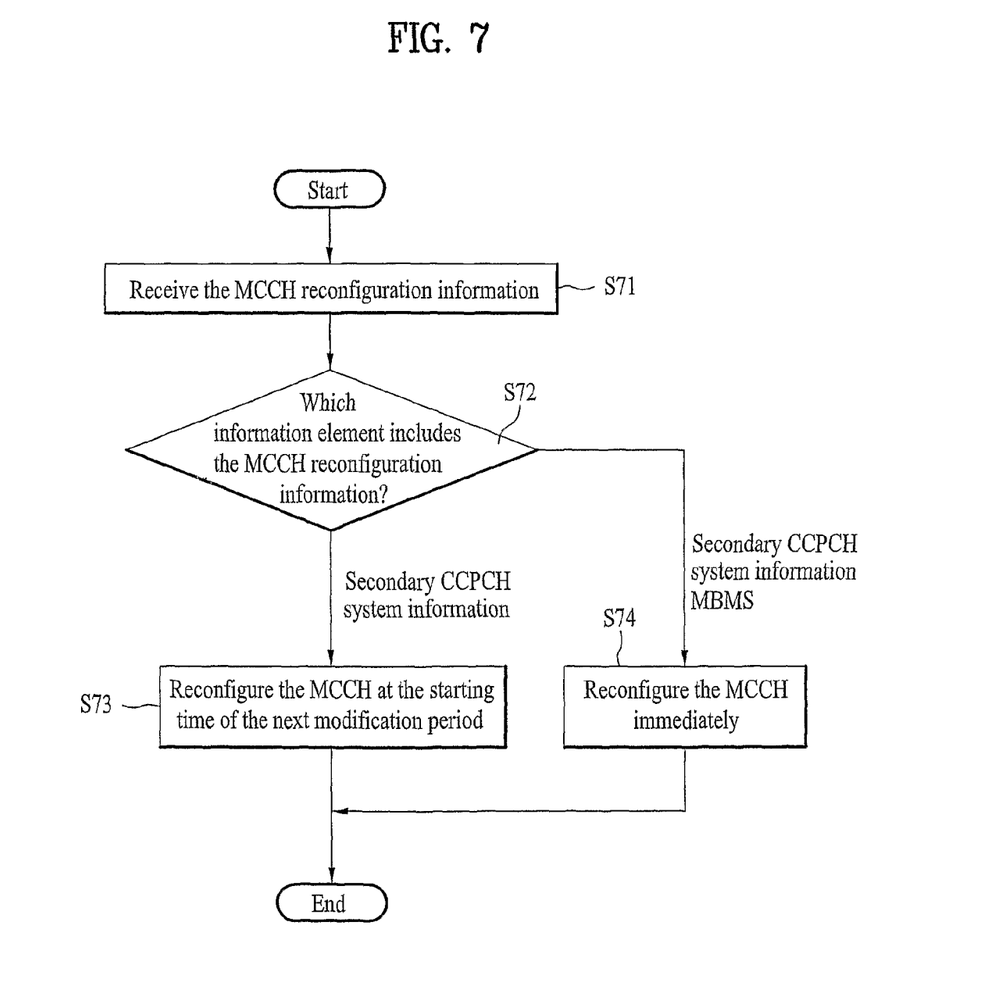
FIG. 7 is a flow chart illustrating the MCCH reconfiguration method in a UE according to the first embodiment.

FIG. 7 is a flow chart illustrating the MCCH reconfiguration method in a UE according to the first embodiment. As shown in FIG. 7, a UE receives a SIB including the MCCH reconfiguration information through the BCCH, in a modification period S71. And, the UE examines which information element of the SIB includes the MCCH reconfiguration information S72.

If the MCCH reconfiguration information is included in Secondary CCPCH system information MBMS which is included in the SIB, the UE may start to reconfigure the MCCH at the starting time of the next modification period S73.

But, if the MCCH reconfiguration information is included in Secondary CCPCH system information which is included in the SIB, the UE may start to reconfigure the MCCH on receiving the Secondary CCPCH system information S74.

Figure 8:
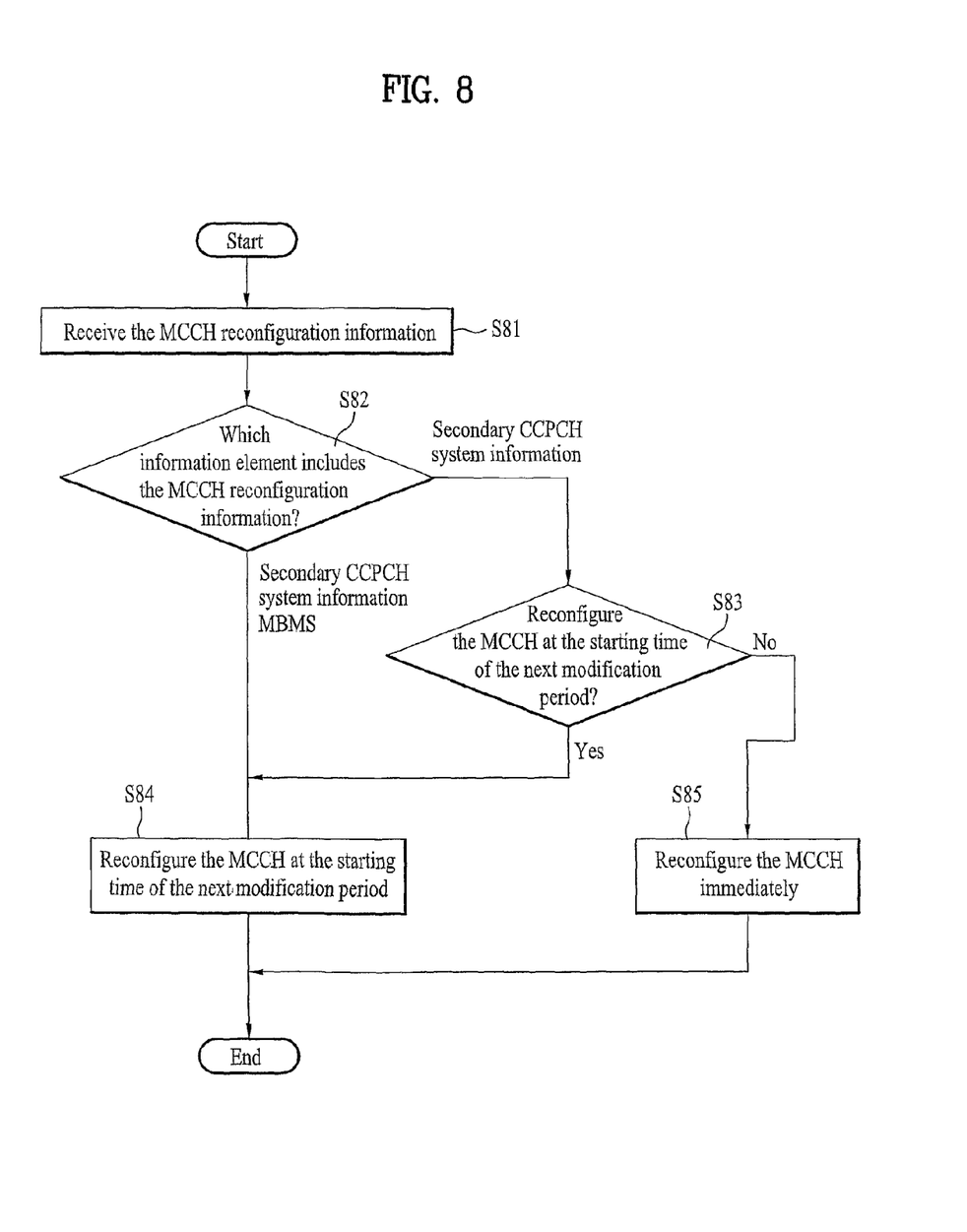
FIG. 8 is a flow chart illustrating the MCCH reconfiguration method in a UE according to the second embodiment.

FIG. 8 is a flow chart illustrating the MCCH reconfiguration method in a UE according to the second embodiment. As shown in FIG. 8, a UE receives a SIB including the MCCH reconfiguration information through the BCCH, in a modification period S81. And, the UE examines which information element of the SIB includes the MCCH reconfiguration information S82.

If the MCCH reconfiguration information is included in Secondary CCPCH system information MBMS which is included in the SIB, the UE may start to reconfigure the MCCH at the starting time of the next modification period S83.

But, if the MCCH reconfiguration information is included in Secondary CCPCH system information which is included in the SIB, the UE may determine the starting time of the MCCH reconfiguration using an indication which is included in the Secondary CCPCH system information. That is, the UE may start to reconfigure the MCCH at the starting time of the next modification period S84 or on receiving the Secondary CCPCH system information S85, according to the indication.

Figure 9:
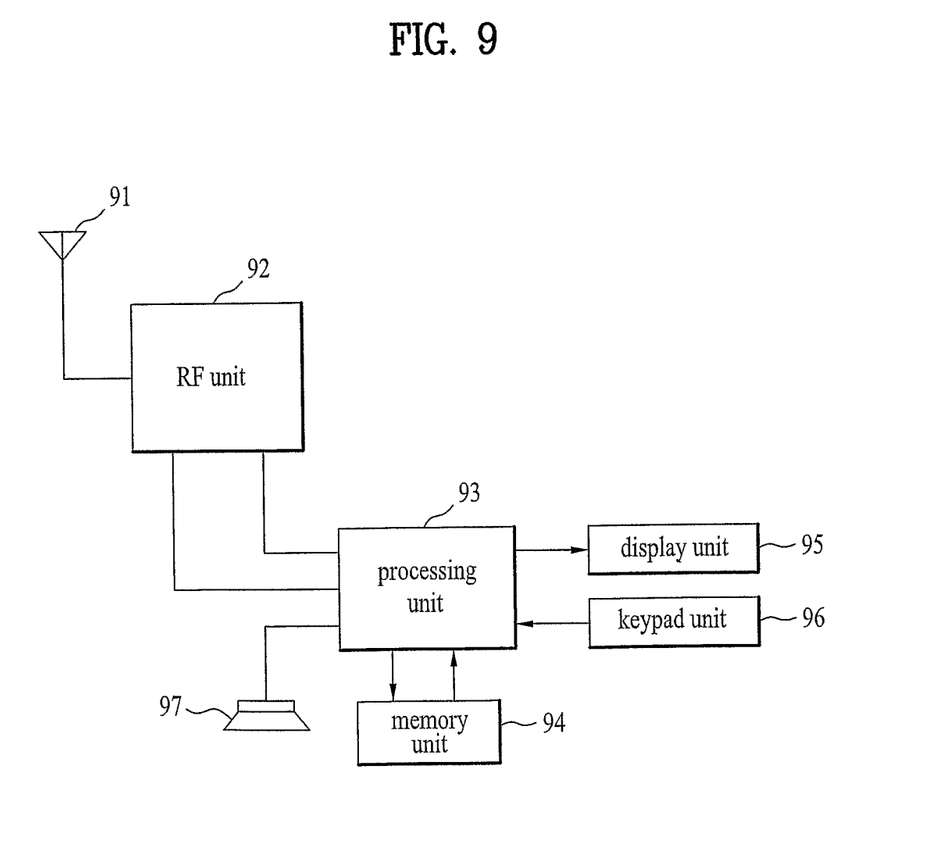
FIG. 9 is a structural diagram illustrating a UE according to the present invention.

FIG. 9 is a structural diagram illustrating a UE according to the present invention. As shown in FIG. 9, the UE comprises an antenna unit 91, a radio frequency (RF) unit 92, a signal processing unit 93 and memory unit 94. The signal processing unit 93 includes a procession unit such as a micro process or a digital signal processor. Further, the UE may also comprise a display unit 95, a key pad unit 96 and speaker unit 97.

The UE receives signals through the MCCH and the BCCH using the antenna unit 91 and the RF unit 92. The signal processing unit 93 reconfigures the MCCH using the signals received through the MCCH and the BCCH according to above-explained process.

Industrial Applicability

The present invention is applicable to a personal digital assistant and a notebook computer capable of mobile communication as well as a mobile phone. Also, the preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Although various embodiments of the present invention have been described with reference to a node-B, the present invention may be applied to a base station or any other type of fixed communication station.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

The invention claimed is:

1. A method of reconfiguring a first common channel at a user equipment in a mobile communication system, the method comprising:
   receiving a system information block (SIB) on a second common channel from a network, the SIB including secondary common control physical channel (SC-CPCH) system information multimedia broadcast multicast service (MBMS) which is a first information element used when the first common channel is mapped to a dedicated physical channel for an MBMS or SCCPCH system information which is a second information element used when the first common channel is mapped to a physical channel, wherein either the first information element or the second information element includes modified channel configuration information of the first common channel;
   checking whether the modified channel configuration information is included in the first information element or the second information element, wherein a starting time of reconfiguring the first common channel is variably determined depending on whether the modified channel configuration information is included in the first information element or the second information element;
   starting to reconfigure the first common channel, immediately after receiving the modified channel configuration information, based on the modified channel configuration information if the modified channel configuration information is included in the first information element; and
   starting to reconfigure the first common channel at a starting time of a next modification period based on the modified channel configuration information if the modified channel configuration information is included in the second information element.

2. The method of claim 1, wherein the first common channel is a control channel for the MBMS.

3. The method of claim 1, wherein the second common channel is a broadcast control channel (BCCH).

4. The method of claim 1, further comprising receiving control information via the reconfigured first common channel.

5. A mobile terminal for receiving data via a second common channel, the mobile terminal comprising:
   an antenna unit configured to receive a system information block (SIB) on the second common channel from a network, the SIB including secondary common control physical channel (SCCPCH) system information multimedia broadcast multicast service (MBMS) which is a first information element used when a first common channel is mapped to a dedicated physical channel for an MBMS or SCCPCH system information which is a second information element used when the first common channel is mapped to a physical channel, wherein either the first information element or the second information element includes modified channel configuration information of the first common channel;
   a radio frequency module configured to process the modified channel configuration information at radio frequency; and
   a processor unit configured to:
      check whether the modified channel configuration information is included in the first information element or the second information element, wherein a starting time of reconfiguring the first common channel is variably determined depending on whether the modified channel configuration information is included in the first information element or the second information element;
      start to reconfigure the first common channel, immediately after receiving the modified channel configuration information, based on the modified channel configuration information if the modified channel configuration information is included in the first information element; and
      start to reconfigure the first common channel at a starting time of a next modification period based on the modified channel configuration information if the modified channel configuration information is included in the second information element.

6. The mobile terminal of claim 5, wherein the first common channel is a control channel for the MBMS.

7. The mobile terminal of claim 5, wherein the second common channel is a broadcast control channel (BCCH).

* * * * *